US006579635B2

(12) United States Patent
Krusin-Elbaum et al.

(10) Patent No.: US 6,579,635 B2
(45) Date of Patent: Jun. 17, 2003

(54) SMOOTHING AND STABILIZATION OF DOMAIN WALLS IN PERPENDICULARLY POLARIZED MAGNETIC FILMS

(75) Inventors: Lia Krusin-Elbaum, Dobbs Ferry, NY (US); Takasada Shibauchi, Uji (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/916,660

(22) Filed: Jul. 26, 2001

(65) Prior Publication Data

US 2002/0094457 A1 Jul. 18, 2002

Related U.S. Application Data

(60) Provisional application No. 60/239,840, filed on Oct. 12, 2000.

(51) Int. Cl.[7] ................................................. G11B 5/66
(52) U.S. Cl. ..................... 428/694 TM; 428/694 SG; 427/548; 427/128; 427/130; 427/131; 427/132; 427/322; 427/327; 427/331; 427/404; 427/405; 148/121
(58) Field of Search .................. 148/100, 101, 148/102, 103, 120, 121, 122; 369/13; 428/694 TM, 694 SG; 360/135; 427/548, 128, 131, 132, 322, 327, 331, 404, 405

(56) References Cited

U.S. PATENT DOCUMENTS

| | | | |
|---|---|---|---|
| 3,792,452 A | 2/1974 | Dixon et al. ................. | 340/174 |
| 3,799,648 A | 3/1974 | Flippen ....................... | 350/150 |
| 4,516,222 A | 5/1985 | Sakurai et al. ................ | 365/32 |
| 4,584,237 A | 4/1986 | Pulliam ....................... | 428/336 |
| 4,692,899 A | 9/1987 | Lo et al. ........................ | 365/29 |
| 5,200,934 A | 4/1993 | Mansuripur ................... | 369/13 |

(List continued on next page.)

OTHER PUBLICATIONS

Kirby, et al; *Magnetization Reversal in nanoscal Magnetic Films with Perpendicular Anisotropy;* The American Physical Society, vol. 49, No. 15; Apr. 15, 1994; pp. 10810–10813.

Allenspach, et al; *Magnetic Domains in Thin Epitaxial Co/Au (111) Films;* Physical Review Letters, vol. 65, No. 26; Dec. 24, 1990; pp. 3344–3347.

Vaterlaus, et al; *Two–Step Disordering of Perpendicularly Magnetized Ultrathin Films;* Physical Review Letters, vol. 84, No. 10; Mar. 6, 2000; pp. 2247–2250.

Weller, et al; *Ion Induced Magnetization Reorientation in Co/Pt Multilayers for Patterned Media;* Journal of Applied Physics, vol. 87, No. 9; May 1, 2000; pp 5768–5770.

Kirliyuk, et al; *Magnetization Reversal in Ultrathin Ferramagnetic Films with Perpendicular Anisotropy;* Journal of Magnetism and Magnetic Materials 171; 1997; pp 45–63.

(List continued on next page.)

*Primary Examiner*—John P. Sheehan
(74) *Attorney, Agent, or Firm*—Casey P. August; Gary M. Hartman; Domenica N. S. Hartman

(57) ABSTRACT

A ferromagnetic film suitable for ultra-high density perpendicular recording, and a process for producing the film. The process generally entails forming a film of ferromagnetic material on a surface of a substrate, such that the film is characterized by perpendicular magnetic anisotropy and comprises a plurality of magnetic domains defined by domain walls perpendicular to a major surface of the film. The ferromagnetic film is formed to have a linear strain defect for the purpose of smoothing and stabilizing the domain walls during subsequent magnetization reversal of the ferromagnetic material. Such smoothing and stabilizing serves to control temporal magnetic noise due to motion of magnetic domains, arrest domain wall motion (reducing velocity) when the film is subjected to the magnetic reversal fields, and controls spatial magnetic noise due to domain wall jaggedness.

20 Claims, 4 Drawing Sheets

U.S. PATENT DOCUMENTS

| | | | |
|---|---|---|---|
| 5,412,627 A | | 5/1995 | Ichihara et al. ............... 369/13 |
| 5,462,811 A | | 10/1995 | Miyamoto et al. .......... 428/694 |
| 5,518,826 A | | 5/1996 | Kudoh et al. ............... 428/694 |
| 5,546,337 A | * | 8/1996 | Hurt et al. .................. 365/121 |
| 5,601,662 A | * | 2/1997 | Hirai et al. ................. 148/100 |
| 5,657,299 A | | 8/1997 | Nakajima et al. ............ 369/13 |
| 5,662,988 A | | 9/1997 | Nakayama et al. ......... 428/212 |
| 5,864,520 A | | 1/1999 | Fukamachi et al. .......... 369/13 |
| 5,935,701 A | | 8/1999 | Nishimura ................. 428/332 |
| 5,936,915 A | | 8/1999 | Fujii et al. .................... 369/13 |
| 5,962,154 A | | 10/1999 | Hashimoto et al. ......... 428/694 |
| 5,976,688 A | | 11/1999 | Kawase et al. ............. 428/332 |
| 5,982,715 A | | 11/1999 | Mori et al. ................... 369/13 |
| 5,998,048 A | | 12/1999 | Jin et al. .................... 428/694 |
| 6,020,079 A | | 2/2000 | Matsumoto et al. ........ 428/694 |
| 6,027,825 A | | 2/2000 | Shiratori et al. ............ 428/694 |
| 6,031,793 A | | 2/2000 | Yoshinari et al. ............ 369/13 |
| 6,069,852 A | | 5/2000 | Miyaoka et al. .............. 369/13 |
| 6,096,444 A | | 8/2000 | Tamanio et al. ............ 428/694 |
| 6,103,405 A | | 8/2000 | Tomita ....................... 428/692 |
| 6,104,676 A | | 8/2000 | Yamamoto ................... 369/13 |
| 6,122,229 A | | 9/2000 | Yonezawa et al. ............ 369/13 |
| 6,125,083 A | | 9/2000 | Nishimura et al. ........... 369/13 |
| 6,147,939 A | | 11/2000 | Takahashi et al. ............ 369/13 |
| 6,150,038 A | | 11/2000 | Hirokane et al. ............ 428/131 |
| 6,177,175 B1 | | 1/2001 | Hashimoto ................. 428/141 |
| 6,221,219 B1 | | 4/2001 | Hashimoto et al. ...... 204/192.2 |
| 6,483,741 B1 | * | 11/2002 | Iwasaki et al. ............. 365/170 |

OTHER PUBLICATIONS

Hong, et al; *Artifically Controlled Stress Anisotropy and Magnetic Properties of FeTaN Thin Films;* Journal of Applied Physics, 81; Apr. 15, 1997; pp. 4510–4512.

Locquet, et al; *Doubling the Critical Temperature of $La_{1.9}Sr_{0.1}CuO_4$ Using Epitaxial Strain,* Letters to Nature, vol. 394; Jul. 30, 1998; pp. 453–456.

* cited by examiner

SMOOTHING AND STABILIZATION OF DOMAIN WALLS IN PERPENDICULARLY POLARIZED MAGNETIC FILMS

CROSS REFERENCE TO RELATED APPLICATIONS

This application claims the benefit of U.S. Provisional Application No. 60/239,840, filed Oct. 12, 2000.

STATEMENT REGARDING FEDERALLY SPONSORED RESEARCH

Not applicable.

BACKGROUND OF THE INVENTION

(1) Field of the Invention

The present invention generally relates to materials and methods for ultra-high density recording. More particularly, this invention relates to ferromagnetic films having thicknesses of a few monolayers and perpendicular magnetic anisotropy, and to a process for increasing bit density in a magneto-optical recording medium formed of such a film. The process entails introducing linear strain defects into the film to smooth and stabilize the walls of the magnetic domains of the film, thereby arresting the domain wall motion (reduced velocity) under application of a magnetic field, reducing temporal magnetic noise due to motion of magnetic domains, and reducing spatial magnetic noise due to domain wall roughness.

(2) Description of the Related Art

Stable magnetic structures on nanometer-length scales are paramount for ever denser and robust storage of information as the superparamagnetic limit is approached, at which magnetic energy contained in a tiny bit can no longer compete with the thermal energy and spontaneous magnetization reversal processes will wipe out stored data. It is believed that the onset of thermal effects may shift to much higher bit densities using perpendicular magnetic polarization of nanoscale ferromagnetic films only a few atomic layers (monolayers) thick to maintain large magnetic anisotropy normal to the film plane. In magneto-optic media formed of such films, bit-writing can be performed with local probes that may be thermally assisted by current or a laser beam that raises the local temperature to the vicinity of the Curie temperature ($T_c$), resulting in the formation of a reversed magnetic domain with a rough wall. Such films make magneto-optical memories appear particularly promising for ultrahigh-density recording on portable disks, with bit densities of about 100 Gbit/inch$^2$ having been demonstrated using recent advances in bit writing and reading techniques. However, the ultimate density of such "up"- ("down"-) magnetic domains (bits) will be set by the domain wall roughness and temporal stability (mobility), which are controlled by the inherent disorder in ultra-thin monolayer films.

Magnetization reversal processes in finite-size magnetic materials occur by nucleation of reversed magnetic domains and by their expansion via displacements of domain walls. In thin films, these processes are largely controlled by defects which can act as nucleation and pinning sites. As a result, domain walls nucleate as rare events on random sites. FIG. 1 shows two neighboring domains of an ultra-thin Pt/Co/Pt trilayer film using magneto-optical polar Kerr imaging. As known in the art, a large uniaxial perpendicular anisotropy can be sustained in the Pt/Co/Pt film as a result of a large interface contribution arising from the orbital overlap of Co-3d and Pt-5d wavefunctions. The trilayer stack was electron-beam evaporated at about 190° C. on a 200 Å (111) Pt buffer layer deposited on glass or SiN$_x$/Si substrates. The walls are very rugged in appearance, with noticeable "overhangs"—regions where domain wall excursions from the average wall position are multivalued. Overhangs appear when domain walls surround unfavorable regions rather than "invade" or slither over them. Magnetization reversal proceeds by domain growth and as magnetic field (H) increases beyond the coercivity ($H_c$) of the film, here, about 750 Oe for the Pt/Co/Pt film. During domain growth, the outward motion of the domain walls becomes increasingly swift. The disorder landscape "fingerprints" both the dynamics and the structure of the walls. In a quenched (time-independent) random pinning potential (e.g., arising from atomic scale imperfections at the film-substrate interface), the walls are expected (in a random field Ising spin system) to be self-affine and have been characterized by a fractal dimension. The extended nucleation sites can provide an initial domain shape anisotropy (elongated domains), but being short-range they do not reduce domain wall velocity or affect roughness on larger scales which evolves with time.

From the above, it can be seen that the ultimate bit density that can be achieved with ultra-thin ferromagnetic films having perpendicular magnetic anisotropy is limited by the magnetization reversal process, which results in magnetic domain walls that are very rugged and grow rapidly. Domain wall roughness also leads to spatial magnetic noise, while domain wall instability causes temporal (time-domain) magnetic noise due to motion of magnetic domains. Accordingly, it would be desirable to provide a method by which the domain walls of ultra-thin ferromagnetic films with perpendicular magnetic anisotropy can be made smooth and their velocity reduced during magnetization reversal.

BRIEF SUMMARY OF THE INVENTION

The present invention provides a ferromagnetic film suitable for ultra-high density perpendicular recording, and a process for producing the film that achieves greater bit density and lower temporal and spatial noise. The process generally entails the use of a film of ferromagnetic material characterized by perpendicular magnetic anisotropy and a plurality of magnetic domains defined by domain walls perpendicular to a major surface of the film. According to the invention, the ferromagnetic film is formed on a surface of a substrate to have a linear strain defect, which has been determined to smooth and stabilize the domain walls during subsequent magnetization reversal of the ferromagnetic material. The smoother domain walls achieved with the invention promotes bit density and controls spatial magnetic noise, while greater domain wall stability serves to arrests domain wall motion (reducing velocity) and control temporal magnetic noise due to motion of magnetic domains.

The invention encompasses any suitable method by which a linear strain defect can be incorporated into a ferromagnetic film to produce a strain field having a long range and unique direction. Particular methods identified include the use of patterned grooves formed on the substrate prior to depositing the film, and the application of a uniaxial force when depositing the film and subsequent release of the force. Suitable films for use with the invention are typically a few monolayers thick, and may contain multiple layers of different materials.

In view of the above, the present invention can be seen to make possible stable nanometer-length magnetic structures for denser and more robust storage of information. Such magnetic structures are robust as a result of using perpendicular magnetic polarization to withstand thermal energy and spontaneous magnetization reversal processes, while the density and stability of such magnetic structures are promoted by controlling wall roughness and temporal stability of their magnetic domains. As a result, the present invention makes possible a recording medium having a greater bit density than writable magneto-optical recording media—possibly in excess of 1 Tbit/inch$^2$—and is suitable for use in a wide variety of applications, including compact discs for personal computers.

Other objects and advantages of this invention will be better appreciated from the following detailed description.

DETAILED DESCRIPTION OF THE INVENTION

The following discussion describes an investigation that demonstrated that a domain wall of a thin (monolayer) ferromagnetic film can be made smooth and its motion nearly halted if the domain wall are subjected to a linear repulsive ("anti-pinning") force produced by a linear strain defect. The investigation further evidenced an elastic nature for such a domain wall, making possible a technique by which the spatial and temporal (time-domain) "noise" of a domain wall can be clamped-down with extended linear strain defect configurations.

Figure 2:
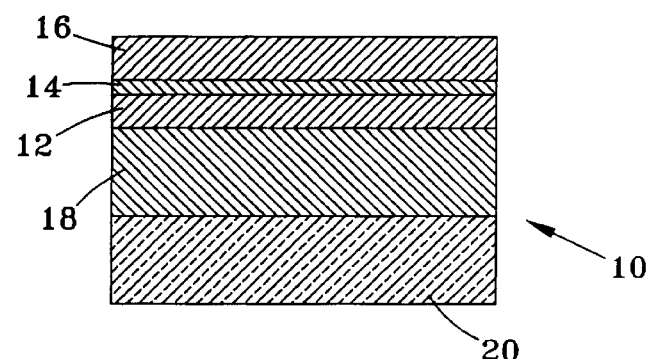
FIG. 2 schematically represents a multilayer nanoscale magnetic structure with perpendicular magnetic anisotropy for use in the present invention.

As previously noted, the magnetization reversal processes in finite-size magnetic materials occur by nucleation of reversed magnetic domains and by their expansion via displacements of the domain walls of the magnetic material. In thin films, and particularly ultra-thin films of only a few Angstroms (e.g., about 5 to 10 Angstroms) thickness, these processes are largely controlled by defects that act as nucleation and pinning sites. In an investigation leading to the present invention, ultra-thin Pt/Co/Pt films were subjected to disorder and driven by an out-of-plane magnetic field, and the time evolution and structure of their domain walls were observed using a magneto-optical polar Kerr imaging technique reported by Argyle et al. in *New Laser Illumination Method for Kerr Microscopy*, J. Appl. Phys. 87 (2000), p. 6487–6489. FIG. 2 schematically illustrates such a film 10 comprising an innermost layer 12 of platinum, a ferromagnetic layer 14 of cobalt, and an outermost layer 16 of platinum. The film 10 is shown as being formed on a buffer layer 18 to assure (111) texturing, which in turn is shown on a smooth substrate 20 of a suitable material.

The multilayer films were formed by electron beam evaporation at about 190° C. on glass and SiN$_x$/Si substrates provided with a 200 Angstrom (111) platinum buffer layer, as described by Weller et al. in *Ion Induced Magnetization Reorientation in Co/Pt Multilayers for Patterned Media*, J. Appl. Phys. 87 (2000), p. 5768–5770. In each of the films, a large uniaxial perpendicular anisotropy was sustained by a large interface contribution proportional to $K_s/d_{Co}$ (arising from the orbital overlap of Co-3d and Pt-5d wavefunctions), in which $d_{Co}$ is the thickness of the cobalt layer 14 and limited to not more than about fifteen Angstroms—beyond this thickness, the magnetization switches from out-of-plane to in-plane, losing the thermal advantage sought with perpendicular magnetic polarization. The investigation primarily made use of films 10 comprising a cobalt layer 14 having a thickness of about seven Angstroms, and sandwiched between platinum layers 12 and 16 of about twenty and about thirty Angstroms, respectively. To erase magnetic history, the magnetization of each films was first saturated at negative magnetic field –H, after which the field was quenched to zero. After a first positive square H-pulse, an up-domain was nucleated and its motion was recorded in images taken before and after subsequent pulses.

Unless patterned nucleation seeds are installed in ferromagnetic films of the type represented in FIG. 2, the domain walls nucleate as rare events on random sites due to a local disorder-diminished anisotropy constant K, resulting in a locally suppressed coercive field $H_c$. The magnetization reversal process proceeds by domain growth, and as the magnetic field H increases beyond the coercivity ($H_c$) of the ferromagnetic material (e.g., about 750 Oe for the defect-free cobalt layers of FIGS. 1 and 3), the outward motion of the domain wall becomes increasingly swift (e.g., greater than about 180 micrometers/s at H=854 Oe), as represented by the two series of photographs shown in FIG. 3. The photographs are polar magneto-optic Kerr microscopy images of domain walls of an ultra-thin Pt/Co/Pt (30 Å/7 Å/20 Å) film, and were acquired in a polarizing (Zeiss-Axiomat) microscope using a 3 W argon laser illumination (λ=638.1 nm) to enhance magnetic phase contrast (only about 10–$^2$ degrees at full) using a laser-beam tandem-dithering technique reported by Argyle et al. to eliminate the detrimental effects of laser coherence (speckles). As a result, the real-time evolution of the domain walls was able to be observed (with CCD or Chelnikon cameras).

Figure 1:
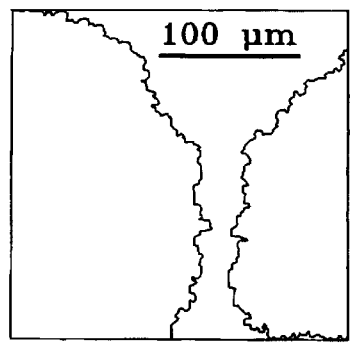
FIG. 1 shows a room temperature Kerr image of adjacent domain walls of a ferromagnetic film of the prior art.
Figure 3:
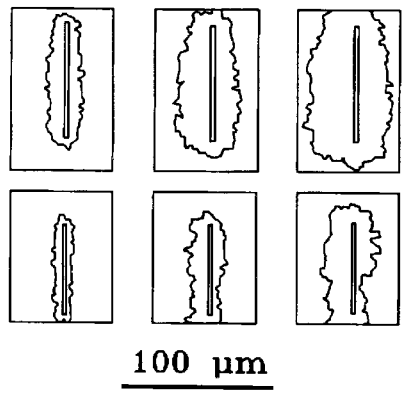
FIG. 3 shows two series of three photographs each, showing the rapid motion of domain walls of a ferromagnetic film seeded with elongated defects and subjected to a magnetic field.

FIG. 1 shows a Kerr image of two neighboring domains of a Pt/Co/Pt film essentially identical to the films shown in FIG. 3. The domain walls can be seen as being very rugged in appearance, with noticeable overhangs where the domain wall protrudes from its average position. These overhangs appear where the domain wall surrounds unfavorable regions rather than invades or slithers over them. As will become evident from the following discussion, such unfavorable regions become unimportant when domain wall elasticity is enhanced through implementation of the present invention. The domain walls shown in FIG. 1 are as they appear after a 854 Oe magnetic field was applied for one second and then removed. Domains are round, i.e., the domain walls are "undirected," and the walls show roughness on length scales much larger than the grain size (about 20 to 30 nm) of the (111) textured Pt buffer layer. The rapid motion of domain walls seeded with elongated defects installed with a 30 keV Ga+ FIB (Focused Ion Beam) is apparent from the snapshots of FIG. 3, taken in a magnetic field of about H=616 Oe after an elapsed time (left to right) of one, four and eight seconds, respectively. Domain wall roughness stemmed from sampling the random potential regardless of the seed defect width, which was about 1500 Angstroms for the film shown in the lower series, and about one micrometer for the film shown in the upper series).

From the above, it can be seen that, though a linear nucleation site may be able to provide an initial domain shape anisotropy (elongated domains), the influence is short-ranged, such that the nucleation sites do not have a long range affect capable of reducing domain wall velocity and roughness, as shown in FIG. 3. To assert control over rugged domain wall structures, the present invention invokes certain concepts pertaining to a separate field—superconductors. More particularly, the present invention relies on the concept of meandering vortex lines in high temperature superconductors, where there is a competition between the elastic energy $\epsilon_{el}$ which stiffens a vortex line, and random disorder which induces a lateral vortex wandering. However, in order to apply a similar idea to the domain walls of a ferromagnetic material, two key concepts are necessarily enforced. First, the domain wall elasticity needs to be enhanced to better negotiate more stubborn random obstacles and thus suppress overhangs. Second, since vortex physics belongs to the universality class of '1+1' dimensional lines (vortex direction is defined by the magnetic field), the domain wall directionality on large scales should be imposed. For a one-dimensional domain wall in a ultra-thin ferromagnetic film a correlated (linear) strain defect was introduced with a three-fold effect. According to the theory of this invention, through magneto-elastic coupling, a linear strain defect is able to (1) give a domain wall a preferred direction (along the defect), (2) increase the elasticity of the domain wall thereby reducing the wall roughness as it negotiates the random landscape, and (3) provide a strain-defect-induced long-range repulsive potential that serves to reduce wall velocity to a nearly full stop when the domain is subjected to a driving field greater than the coercive field of the undetected film.

Suitable defects for the practice of this invention can be installed during deposition of the ferromagnetic layer 14 (e.g., the cobalt layer) by imposing an anisotropic (uniaxial) strain (either tensile or compressive) on the underlying substrate (e.g., substrate 20), followed by release of the strain. The result is a linear strain field that produces a "fold" in the ferromagnetic layer 14. A technique capable of accomplishing this is reported by Deng et al. in *Artificially Controlled Stress Anisotropy and Magnetic Properties of FeTaN Thin Films*. J. Appl. Phys. 81 (1997), p. 4510–4512. However, the technique used by Deng et al. did not produce a localized stress pattern, and therefore did not introduce linear defects in their substrates. Instead, Deng et al. employed the technique to switch the easy-hard axis of in-plane anisotropic films, and not films with magnetic anisotropy normal to the film plane. As such, Deng's application of the technique was unrelated to and incapable of modifying or controlling domain wall roughness and velocity of an out-of-plane anisotropic film, as done in the present invention. An alternative technique is to install a linear strain field by patterning either surface of the substrate 20 using a line or a grid pattern (e.g., V-grooves, square cuts, or diagonal notches) prior to film deposition. After film deposition, folds are formed in the ferromagnetic layer 14 by applying a uniaxial tension (or compression) accompanied by annealing at an appropriate temperature for the layer 14, e.g., about 200° C. for 30 minutes. Yet another alternative uses a piezo-electric film to apply a uniaxial tension or compression to the substrate 20. The piezo-electric film (not shown) can be deposited under the buffer layer 18 or on top of the ferromagnetic layer 14 or outermost layer 16. The piezo-electric film is preferably patterned as thin stripes, e.g., about 1000 Angstroms or less. Linear strain defects are then installed by applying an appropriate voltage to the piezo-electric stripes, producing a tensile (or compressive) strain field perpendicular to the stripe direction.

Figure 4:
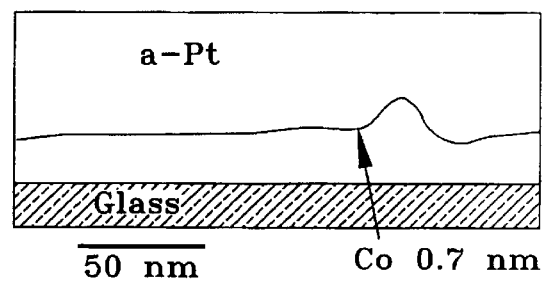
FIG. 4 is a cross-sectional electron transmission micrograph of a multilayer magnetic structure in which an asymmetric "fold" has been introduced as a linear strain defect in accordance with the present invention.

A film in which a linear defect has been introduced in accordance with the invention is shown in the cross-sectional transmission electron micrograph of FIG. 4, in which a fold can be seen in the cobalt layer of a 300 Angstrom Pt/Co/Pt film deposited on a 200 Angstrom Pt buffer layer, all of which was deposited on a glass substrate. (FIG. 4 shows an amorphous Pt ("a-Pt") overlayer deposited to protect the three-layer Pt/Co/Pt structure during the FIB process by which the magnetic domains were seeded with elongated defects.) The fold was produced by applying a tension in the plane of the substrate during deposition of the 7 Angstrom-thick cobalt layer. Following deposition and the release of the tension, the fold locally elevated the film by about 100 Angstroms (roughly half of the buffer layer), and introduced a y-axis invariant long-range strain field $\epsilon(x)$. A remarkable reduction in domain wall roughness and speed resulting from the presence of the fold in the film is evidenced in the series of photographs shown in FIG. 5, in which the location of the fold is identified with a dashed line. The images here were taken in a magnetic field of about 924 Oe (i.e., well above the 854 Oe magnetic field applied to produce the image shown in FIG. 1) after elapsed times of about 40 and 1800 seconds. As seen from the right-hand photograph, the domain wall propagating in the x direction as approximately parallel to the defect in the y direction.

Figure 5:
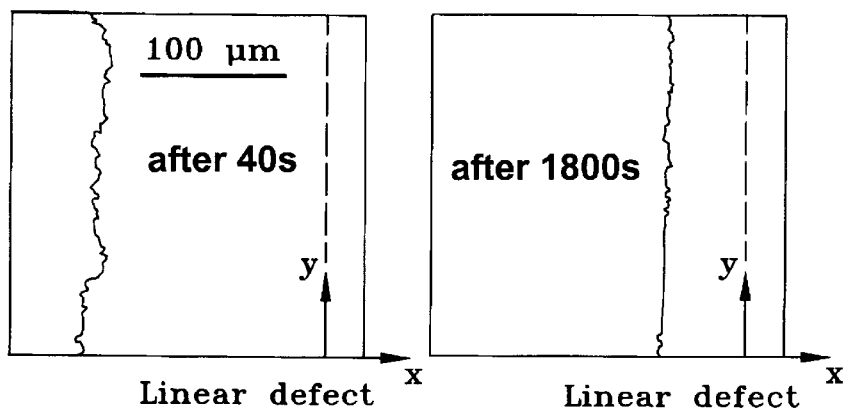
FIG. 5 is a series of two photographs showing a reduction in the domain wall roughness and speed of a ferromagnetic film in which a linear strain defect of the type shown in FIG. 4 was introduced.
Figure 6:
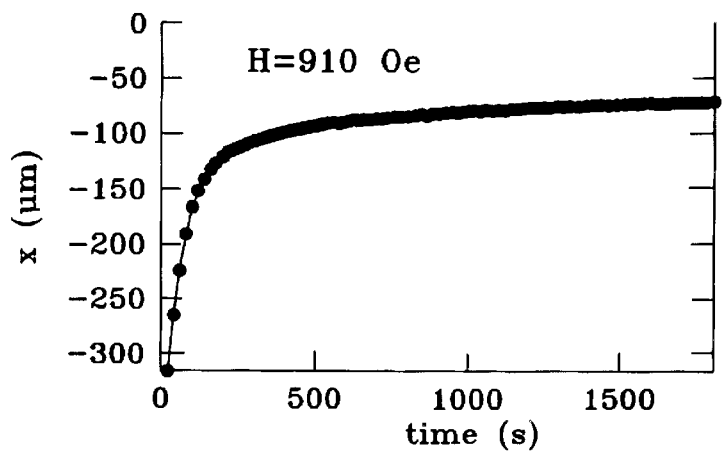
FIG. 6 plots as a function of time the average position of a domain wall driven by an out-of-plane magnetic field toward a linear strain defect in a multilayer magnetic structure.
Figure 7:
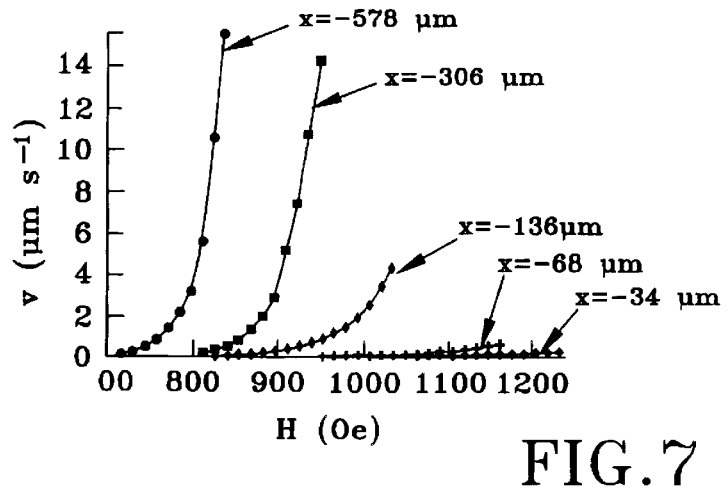
FIG. 7 plots domain wall velocity as a function of applied magnetic field for domain walls at different positions from a linear strain defect in a multilayer magnetic structure.

The domain wall driven by a magnetic field toward the linear strain defect of FIGS. 4 and 5 presents a striking structural contrast against the random (isotropically) disordered film in FIG. 1. Even at large distances (e.g., 300 micrometers) from the fold, the domain wall remained direct, i.e., it conformed on the average to the defect line along the y axis, becoming progressively smoother and straighter as it approached the defect. Significantly, the propagation of the domain wall toward the defect also rapidly decelerated as it neared the defect. This deceleration and near localization of a domain wall is illustrated in FIG. 6 for a magnetic field of about 910 Oe, and was determined to be strongly dependent on the proximity of the wall to the defect (x), as represented by the spatial progression of the velocity-vs-field (force) response shown in FIG. 7. In FIG. 6, the position-vs-time function x(t) is nearly constant at the foothill of the line-defect "ridge" at x=0, evidencing that the extracted wall velocity becomes very small in the vicinity of the maximum strain field. In FIG. 7, domain wall velocity is plotted as a function of applied magnetic field for different values of x. The v-H curves of FIG. 7 are strongly nonlinear. At positions far away (e.g., 578 micrometers) from the defect, wall velocity takes off rapidly in a magnetic field near the critical field $H_{crit}$ (often referred to in literature as a "propagation field"). $H_{crit}$ increases as the distance from the defect decreases, and wall velocity remains near zero when subjected to a magnetic field below $H_{crit}$. A similarly sluggish nonlinear behavior below $H_{crit}$ has also been reported for the motion of a one-dimensional domain wall in a thin cobalt film by Lemerle et al. in *Domain Wall Creep in an Ising Ultra-thin Magnetic Film*, Phys. Rev. Lett. 80 (1998), p. 840. Such a nonlinear response in the limit of a vanishing driving force is a signature of glassy (creep) dynamics and established for the meandering vortex lines through measurements of voltage-vs-current (V–I) characteristics. Above $H_{crit}$ (corresponding to the critical current $J_c$ in superconductors), the driving field exceeds pinning (by random disorder) and the domain wall response becomes linear (ohmic in a superconductor) and fast. FIG. 7 shows a field-forward advance of v-H curves, and hence magnetic fields exceeding $H_{crit}$ as the domain wall approaches the defect (at x=0). Notably, even at the maximum distance (578 micrometers) from defect, the domain wall velocity is orders of magnitude lower than in the undefected film shown in FIG. 1.

Figure 8:
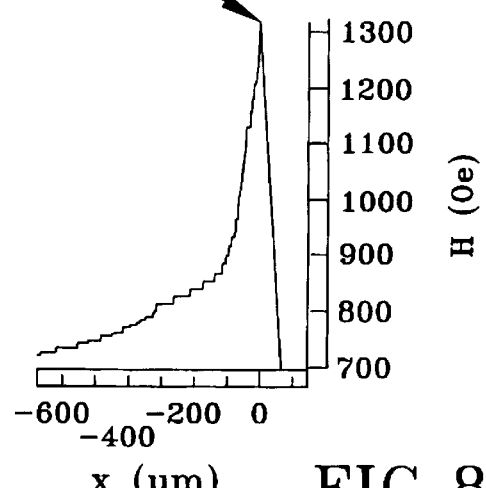
FIGS. 8 and 9 are plots showing that a repulsive force field exerted on a magnetic field-driven domain wall by a linear strain defect modifies the anisotropy constant and changes the elastic energy of the wall.
Figure 9:
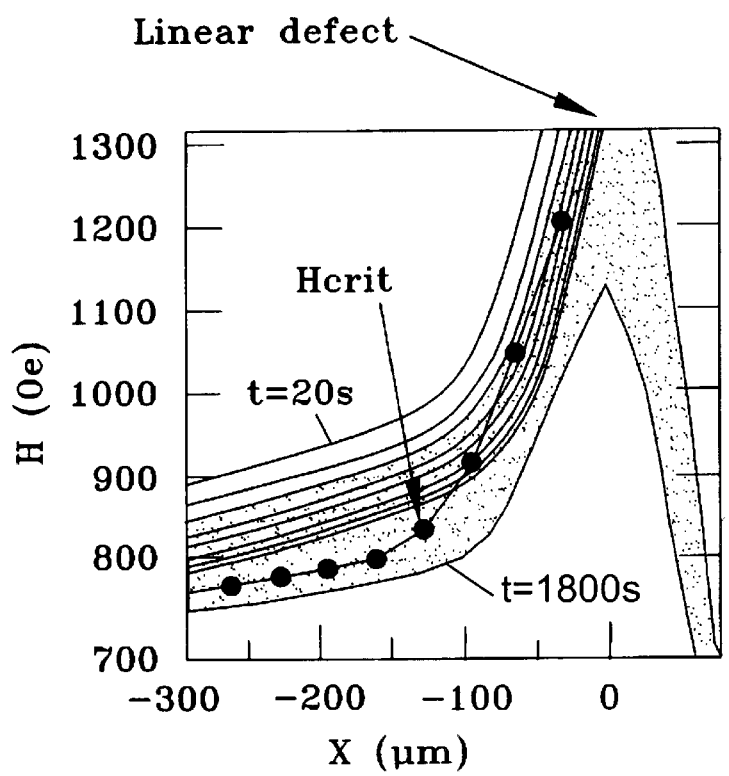

$H_{crit}(X)$—smeared due to finite temperature—is obtained by the usual velocity cutoff criterion, here chosen at v=0.14 μm/s, and mimics the long-range repulsive potential as shown in FIGS. 8 and 9, which map the spatial extent of the force field H(x) exerted on the domain walls by a linear strain defect. The shape of H(x)—a potential ridge in the y direction—is extracted directly from Kerr images taken with increasing H after a fixed propagation time t (FIG. 8), and more quantitatively from the averaged domain wall positions $(<X^2>)^{1/2}$ vs time at all fields (FIG. 9). FIG. 9 clearly illustrates that it takes a higher field H to get closer to the defect; but at any H, after t=1800 seconds, two domain walls—one approaching the ridge from the left and another from the right—become essentially stationary.

The present invention can also be examined in connection with a glassy picture, where the relevant length scale is a collective pinning length $L_c=(\epsilon_{el}^2\xi/\Delta)^{1/3}$ and ξ and Δ are characteristic length scale and strength, respectively, of underlying random disorder. At lengths $L>L_C$, the domain wall will elastically adjust to the random landscape to nestle in a local minimum energy configuration. The spatially varying domain wall (DW) energy density γ (in addition to a uniform field term and ignoring a weak dipolar energy term) can be written as a sum of three: the exchange energy $\gamma_{ex}(x)$, the anisotropy energy $\gamma_{an}(x)$, and the magneto-elastic energy $\gamma_{mel}(x)$ coupling to the strain field $\epsilon(x)$ generated by the line-defect, $$\gamma_{DW} = \underbrace{A(d\theta/dx)^2}_{\gamma_{ex}} - \underbrace{K'm_z^2}_{\gamma_{an}} - \underbrace{B\varepsilon(x)m_z^2}_{\gamma_{mel}} + H^2 d_{Co}/8\pi \qquad (1)$$

Figure 10:
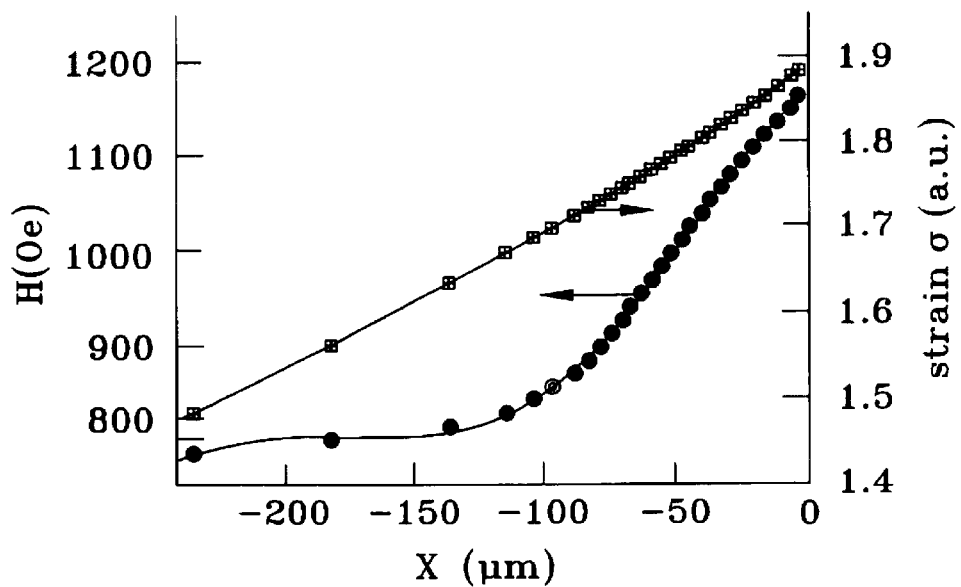
FIGS. 10, 11 and 12 plot the strain field, enhanced renormalized anisotropy constant, and the elongated scaling length calculated from the defect force-field contour for the left domain of FIGS. 8 and 9.
Figure 11:
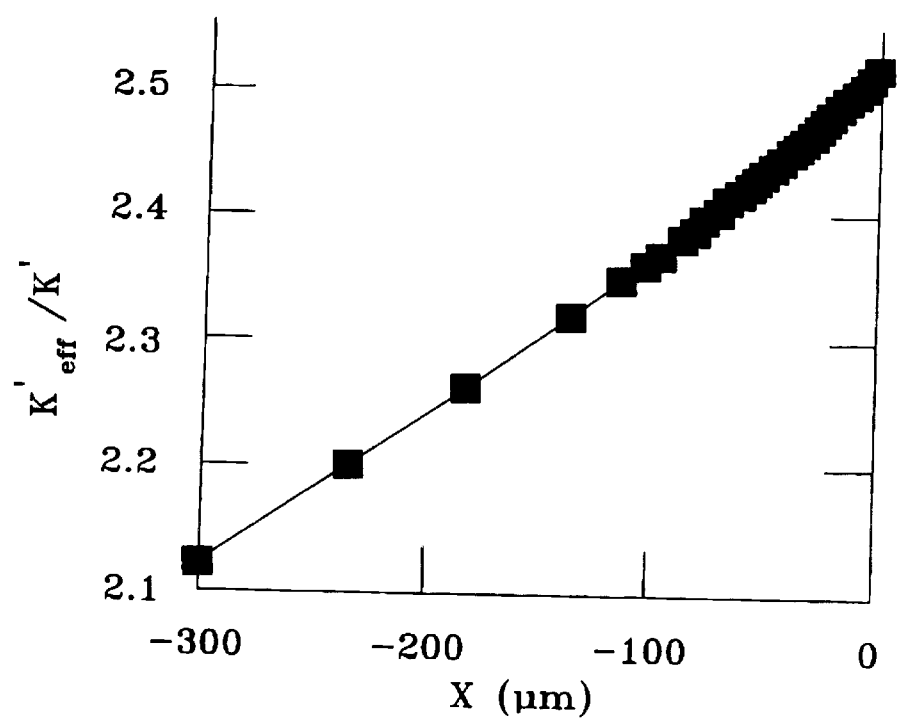
Figure 12:
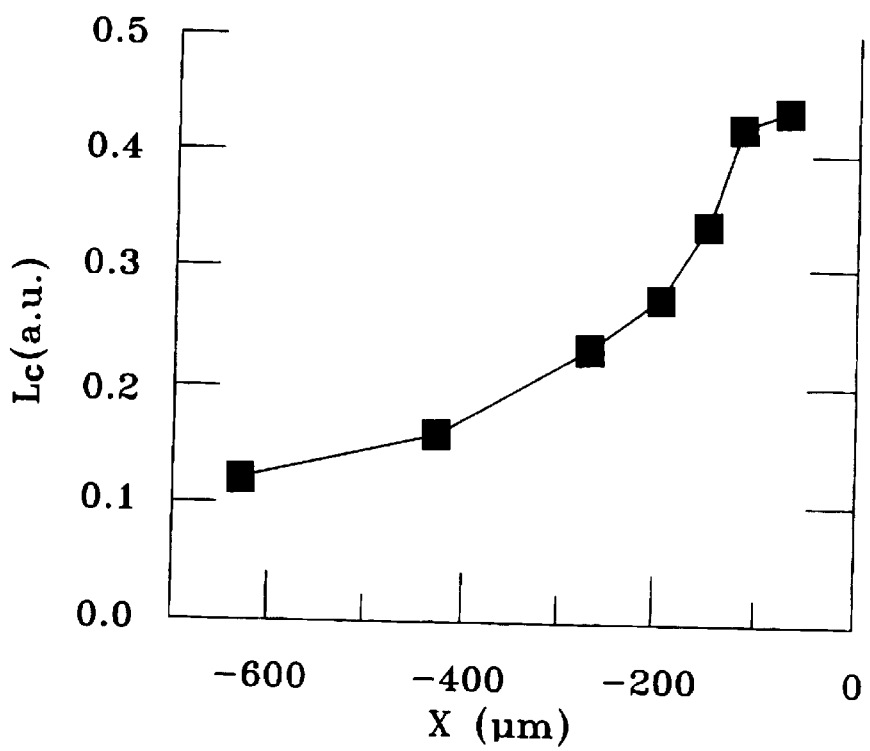

Here, A is the exchange stiffness, $K'=K-2\pi M_S$ ($M_S$ is Pt polarization enhanced saturation magnetization of Co), and B is related to Young's modulus of the film. Magnetization $\vec{M}$ rotates from "up" to "down" within the wall thickness δ (estimated at about 30 Angstroms), and the wall (in the simplest form) is of Bloch type where the azimuthal angle φ=0° and the rotation is parameterized by an angle θ between the z-axis and $\vec{M}$ ($m_x$ is the direction cosine along z). Minimizing Equation (1) with respect to θ leads to $\gamma_{DW}=4(AK'_{eff})^{1/2}$ where $K'_{eff}=K'+B\epsilon(x)$. The total wall energy density in a magnetic field H is $\epsilon=\gamma_{DW}-2M_S H_x$. From the stability condition d$\epsilon$/dx=0, the following nonlinear differential equation for $\epsilon(x)$ is obtained:

$$H(x)=A(M_S)^2 B(d\epsilon/dx)(AK'_{eff})^{-1/2} \qquad (2)$$

which is solved numerically (FIG. 10) using experimentally determined H(x) from FIGS. 8 and 9. The result is an enhanced effective anisotropy, $K'_{eff}$, plotted in FIG. 11. An immediate consequence of this is that the elastic energy $\epsilon_{el}=4(AK'_{eff}d_{Co})^{1/2}$ of a domain wall is enhanced, which is key to reduced domain wall roughness. This translates into a longer $L_c$—the length segment of the wall that can be pinned independently—which leads to reduced jaggedness. This can be seen from the analysis of transverse displacements of the domain wall segments by computing from the domain wall images (FIG. 5) a line shape correlator $x_t=([x(y)-x(y+L)]^2)^{1/2}$, predicted for $L<L_c$ to scale as $x_t(L/L_c)^{3/2}$. FIG. 12 shows that the characteristic length $L_c$ is enhanced in the vicinity of the line-defect by a factor of about five, which implies a reduction of roughness, as measured by $x_t$, by a factor of about ten on the shortest length scales. This in turn represents a potential increase in the areal density by nearly two orders of magnitude. In close vicinity of the defect peak, the defect entirely suppresses domain wall motion and wins over randomness. The collective glassy dynamics due to quenched disorder is no longer at work, the relevant length scale becomes the transverse localization length, and the domain wall becomes essentially flat up to the saturation field. Random disorder still corrugates the repulsive potential with local hills and valleys, providing friction against the motion of the domain wall when the driving field is removed. And additional benefit is a reduced wall thickness, $\delta=4(AK'_{eff})^{1/2}$, further assisting in "writing" smaller bits.

It is important to emphasize here that the invention makes use of an essential difference between a single superconducting vortex and a single elastic domain wall, namely, the elasticity of a domain wall can be manipulated, while the elastic energy of a superconducting vortex is fixed by the material parameters, such as, for example, magnetic penetration depth λ and superconducting anisotropy. The structure and the dynamics of directed elastic walls are connected in a perpendicular anisotropy magnetic film having a thickness of a few monolayers, and the invention forms and uses a linear strain defect that stabilizes both. The defect also installs a y-invariant strain field providing a strong repulsive (anti-pinning) long-range potential counteracting the action of random disorder, increases $H_{crit}$ and, relatedly, the coercivity of the ferromagnetic film. By enhancing the elastic energy of domain walls, such a correlated defect reduces wall roughness and effectively arrests their motion. As in superconductors, a strongly attractive but short-range linear pin would only alter domain wall dynamics locally; otherwise, a high density of pins ought to be introduced. Here, due to a long range pinning effect, only a few such defects need to be tailored to stabilize large areas of ultrathin films to write secure bits at small dimensions, materially simplifying fabrication requirements.

While the invention has been described in terms of a particular embodiments, it is apparent that other forms could be adopted by one skilled in the art. Accordingly, the scope of the invention is to be limited only by the following claims.

What is claimed is:

1. A method of stabilizing domain walls in a film of a ferromagnetic material on a surface of a substrate, the film having a thickness of a few atomic layers, having perpendicular magnetic anisotropy, and comprising a plurality of magnetic domains defined by domain walls perpendicular to a major surface of the film, the method comprising providing a linear strain defect in the film of ferromagnetic material, wherein the domain walls are smoothed and stabilized by the linear strain defect during subsequent magnetization reversal of the ferromagnetic material.

2. A method according to claim 1, wherein the linear strain defect is introduced by forming a pattern of grooves on the substrate prior to forming the film on the substrate.

3. A method according to claim 1, wherein the linear strain defect is introduced by applying a force to substrate in a direction perpendicular to the surface, depositing the film on the surface, and then releasing the force.

4. A method according to claim 3, wherein the force is applied by applying a voltage to a piezoelectric film supported with the substrate.

5. A method according to claim 1, wherein the film has a thickness of not more than fifteen Angstroms.

6. A method according to claim 1, wherein the film comprises multiple layers of different materials.

7. A method according to claim 6, wherein the film comprises a layer of cobalt between layers of platinum.

8. A method according to claim 7, wherein the layers of the film are deposited on the substrate held at a temperature of about 170° C. to about 200° C.

9. A method according to claim 7, wherein the cobalt layer has a thickness of up to 15 Angstroms.

10. A method according to claim 7, wherein the film is deposited on a buffer layer on the substrate, the buffer layer assuring (111) texturing of the film.

11. The film produced by the method of claim 7.

12. The film produced by the method of claim 1.

13. A method of stabilizing domain walls in a film of a ferromagnetic material, the method comprising the steps of:

depositing a buffer layer on a first surface of a substrate formed of silicon, silicon nitride, silicon dioxide or glass;

depositing the film of ferromagnetic material on the buffer layer, the film being a few atomic layers thick and comprising a plurality of magnetic domains defined by domain walls perpendicular to the surface of the film; and introducing a linear strain defect in the film, the linear strain defect smoothing and stabilizing the domain walls during subsequent magnetization reversal of the ferromagnetic material.

14. A method according to claim 13, wherein the linear strain defect is introduced by:

applying a uniaxial tensile or compressive force in a direction perpendicular to first the surface; and then after depositing the film, releasing the force.

15. A method according to claim 14, wherein the force is applied by:

forming a pattern of piezoelectric stripes on the first surface and/or the film; and then applying a voltage to the piezoelectric film to produce the uniaxial tensile or compressive force in a direction perpendicular to the stripes.

16. A method according to claim 13, wherein the linear strain defect is introduced by:

forming a pattern of grooves on the first surface of the substrate or on an oppositely-disposed second surface of the substrate prior to depositing the film;

after depositing the buffer layer and the film, applying a uniaxial tensile or compressive force to the substrate; and then annealing the film.

17. A method according to claim 13, wherein the film comprises a layer of cobalt between layers of platinum, the cobalt layer having a thickness of up to 15 Angstroms.

18. A method according to claim 17, wherein the film is deposited on the substrate held at a temperature of about 170° C. to about 200° C.

19. The film produced by the method of claim 17.

20. The film produced by the method of claim 13.

* * * * *